United States Patent
Moore et al.

[11] Patent Number: 5,253,916
[45] Date of Patent: Oct. 19, 1993

[54] MOTOR VEHICLES

[75] Inventors: Donald J. Moore, Wolston; Michael Colley, Coventry, both of England

[73] Assignee: Jaguar Cars Limited, United Kingdom

[21] Appl. No.: 7,152

[22] Filed: Jan. 21, 1993

[30] Foreign Application Priority Data

Jan. 25, 1992 [GB] United Kingdom ............... 9201648
Aug. 26, 1992 [GB] United Kingdom ............... 9218106

[51] Int. Cl.$^5$ .............................................. B60N 3/00
[52] U.S. Cl. ........................... 296/180.5; 296/37.16; 296/85
[58] Field of Search ............ 296/180.1, 180.5, 85, 296/37.16; 180/903

[56] References Cited

U.S. PATENT DOCUMENTS 4,838,604  6/1989  Kochi ............................ 296/180.5

FOREIGN PATENT DOCUMENTS 0233777 8/1987 European Pat. Off.
0361624 4/1990 European Pat. Off.
0394675 10/1990 European Pat. Off.
26353 11/1923 France ................................ 296/85
571426 5/1924 France ................................ 296/85
572156 6/1924 France ................................ 296/85
0188520 8/1988 Japan ............................ 296/180.1
2225992 6/1990 United Kingdom ........... 296/180.1

Primary Examiner—Dennis H. Pedder
Attorney, Agent, or Firm—Davis, Bujold & Streck

[57] ABSTRACT

A wind deflector for shielding the occupants of a convertible vehicle from backdraughts, has a rigid board mounted on a substantially flat surface behind the seats of the vehicle, the board being mounted on the flat surface by means of a linkage mechanism by which it may be moved between a retracted position, in which it lies flat against the flat surface, to an operative position in which it extends upwardly behind the seats to a height sufficient to shield the occupants of the vehicle from backdraughts, the lower edge of the rigid board being spaced above the flat surface when the rigid board is in its operative position and an extension of the deflector being attached to the rigid board and the flat surface, to fill the gap therebetween.

10 Claims, 6 Drawing Sheets

MOTOR VEHICLES

BACKGROUND TO THE INVENTION

The present invention relates to motor vehicles and in particular to convertible motor vehicles.

With convertible vehicles, when the hood is down air is deflected by the windscreen over the passenger compartment. However, turbulence towards the rear of the passenger compartment produces a backdraught which can be particularly uncomfortable for the occupants of the vehicle.

Hitherto, it has been proposed to locate a rigid board behind the passenger seats to deflect this backdraught. However, in order to obtain sufficient height to be effective, some difficulty has been encountered in locating the board in the space available behind the seats. In U.S. Pat. No. 4,838,604, the board is positioned so that it may be moved from a retracted position in which it extends downwardly behind the seats of the vehicle to an operative position in which it is located upright behind the seats. However, in order to move the board from the retracted to the operative position, it is necessary to move the seats requiring the vehicle to be stopped while this is done. In European Patent Specification No 0,233,777, a separate rigid board is mounted behind the seats, this however presents storage problems when the board is not in use.

An alternative approach is to use a flexible member, for example in the form of a roller blind as is also described in European Patent Specification No 0,233,777. This however requires a support structure, for example in the form of a roll-over bar, in order to support the upper edge of the flexible member at an appropriate height.

The present invention provides a wind deflector which may be located in the restricted space behind the seats of a vehicle, and may be moved between; a retracted position in which it occupies a minimum of space; and an operative position in which it extends upwardly behind the seats of the vehicle, to deflect any backdraughts; the wind deflector being movable between its retracted and operative positions without adjustment of any of the other components of the vehicle.

SUMMARY OF THE INVENTION

According to one aspect of the present invention a wind deflector for shielding the occupants of a convertible vehicle from backdraughts comprises, a rigid board which is mounted on a substantially flat surface behind the seats of a vehicle, the board being mounted on the flat surface by means of a linkage mechanism by which it may be moved between a retracted position, in which it lies flat against the flat surface, to an operative position in which it extends upwardly behind the seats to a height sufficient to shield the occupants of the vehicle from backdraughts, the lower edge of the rigid board being spaced above the flat surface when the rigid board is in its operative position and an extension of the deflector being hinged between the rigid board and the flat surface.

The use of a hinged extension in the manner described above will enable a relatively narrow rigid board to be used, so that it may be accommodated in the restricted space available when in its retracted position, while extending to the appropriate height when in its operative position.

According to a preferred embodiment of the invention, the extension to the rigid board is made of a flexible windproof material, the rigid board serving as a support for the upper edge of the flexible extension.

BRIEF DESCRIPTION OF THE DRAWINGS

An embodiment of the invention is now described, by way of example only, with reference to the accompanying drawings in which.

DESCRIPTION OF A PREFERRED EMBODIMENT

Figure 1:
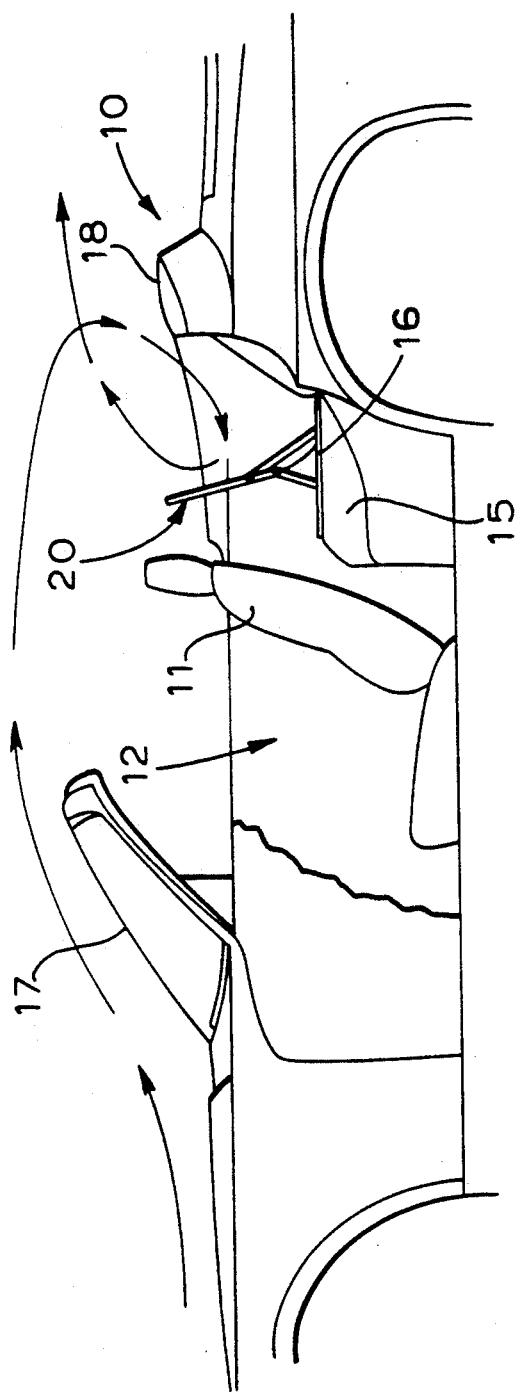
FIG. 1 is a part sectional view of a motor vehicle with wind deflector in accordance with the present invention.
Figure 2:
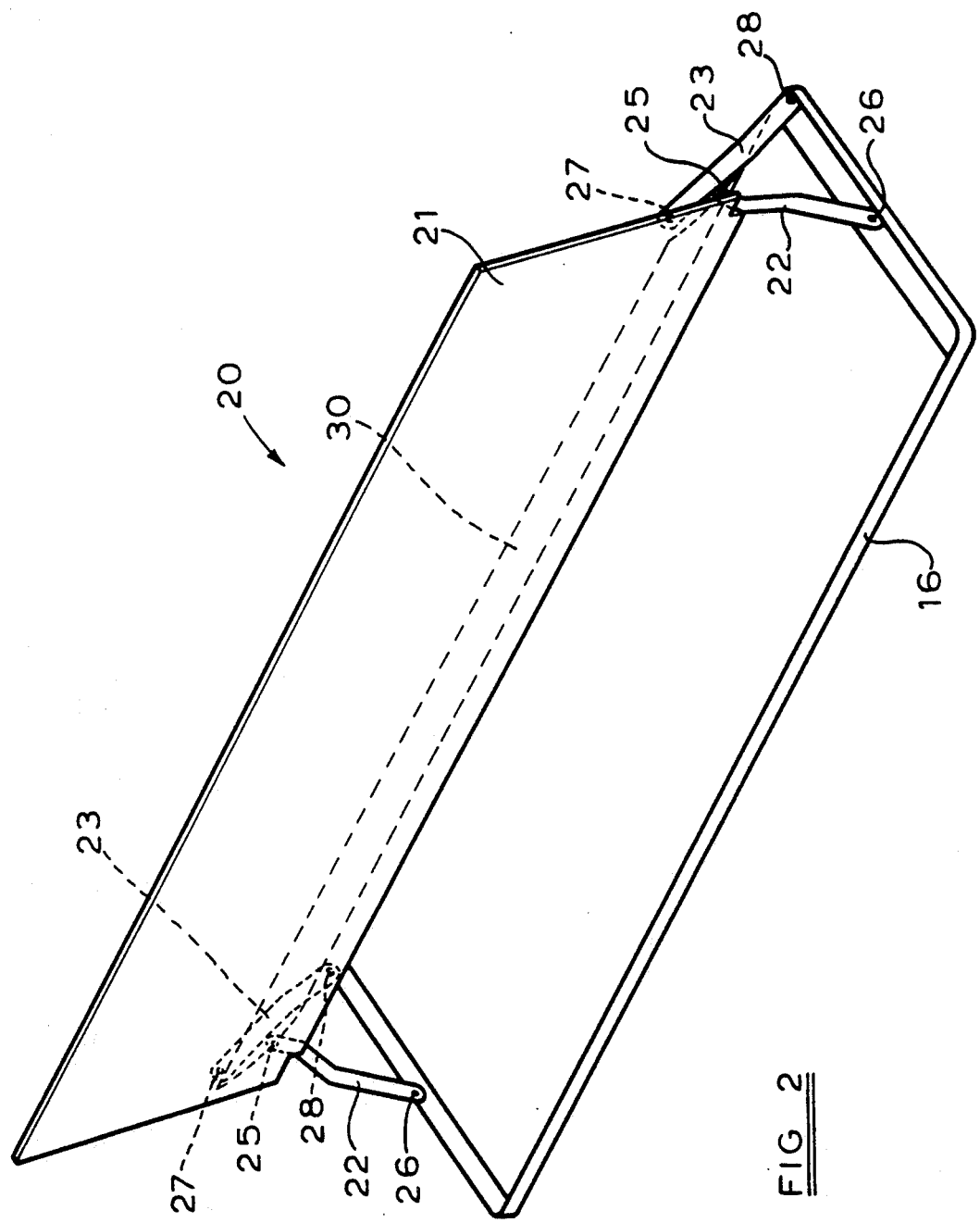
FIG. 2 is a perspective view of the wind deflector illustrated in FIG. 1, in its operative position.

As illustrated in FIG. 1, a convertible motor vehicle 10 has a pair of seats 11, located in a passenger compartment 12. A luggage locker 15 is located behind the seats 11, the luggage locker 15 having a lid 16. A windscreen 17 is provided at the forward end of the passenger compartment 12, the vehicle hood 18, in its folded position, being located at the rearward end of the passenger compartment 12.

As illustrated by arrows in FIG. 1, when the vehicle 10 is moving, air is deflected over the passenger compartment 12 by the windscreen 17. However, turbulent flow towards the rear of the passenger compartment 12, creates a backdraught.

Figure 3:
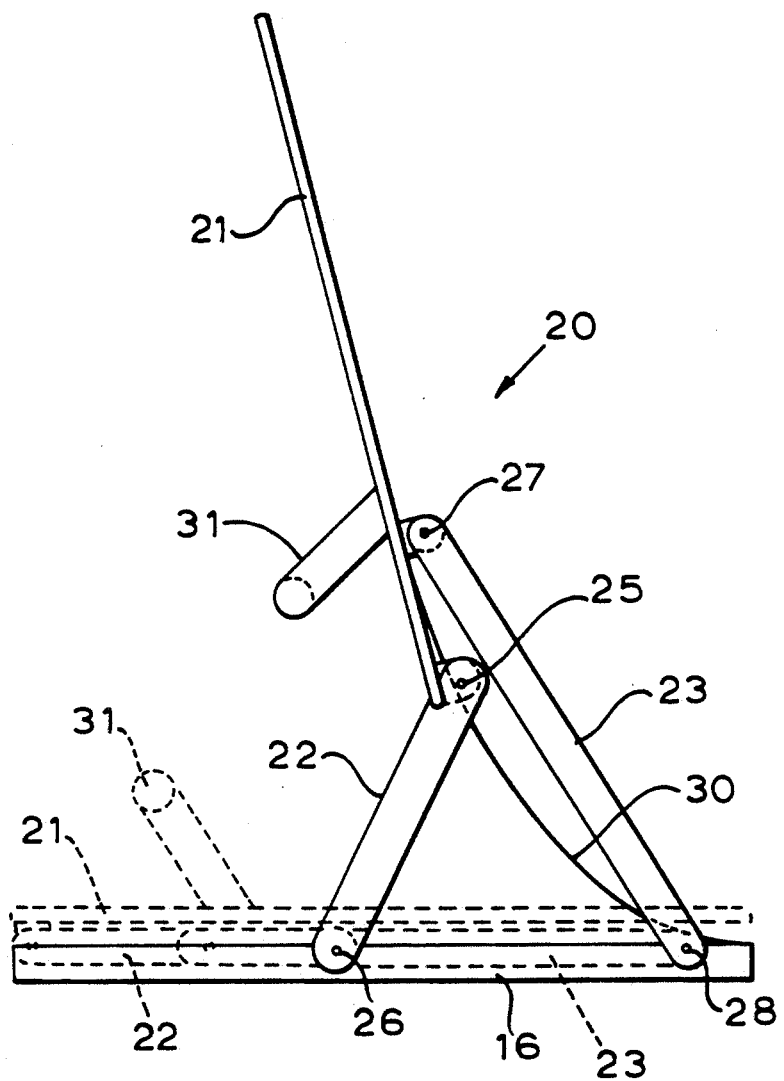
FIG. 3 illustrates, in side elevation, the wind deflector shown in FIG. 1, in its operative and retracted positions.

A wind deflector 20 is mounted on the lid 16 of the luggage locker 15. The wind deflector 20 comprises a rigid board 21 which is connected at each end to adjacent ends of the lid 16 by means of a pair of links 22 and 23. The first link 22 on each end of the board 21 is pivotally connected at one end 25 adjacent a longitudinal edge of the rigid board 21, the other end 26 of link 22 being pivotally connected intermediate of the longitudinal edges of lid 16; while the second link 23 on each end of the board 21 is pivotally connected at one end 27 intermediate of the longitudinal edges of rigid board 21 but spaced towards the edge attached to link 22, and at the other end 28 to the rearward longitudinal edge of the lid 16. In this manner, the rigid board 21 may be moved from an operative position as illustrated in FIG. 1, in which the rigid board 21 extends upwardly above the belt line of the vehicle; to a retracted position in which both links 22 and 23 are pivoted forwardly, the lower longitudinal edge of rigid board 21 being pivoted forwardly and the upper longitudinal edge being pivoted rearwardly, so that the rigid board 21 lies flat against the lid 16 (as illustrated in broken line in FIG. 3).

An extension 30 to the rigid board 21 is made of flexible windproof material and is secured to the board 21 along the line adjacent to the pivot axis between the links 23 and board 21. The opposite edge of extension 30 is secured along the rear longitudinal edge of lid 16. In this manner, when the rigid board 21 is in its operative position, the flexible extension 30 will close the gap between the rigid board 21 and lid 16, while in its retracted position the flexible extension 30 will be folded under the rigid board 21. A handle 31 may be provided on the rigid board 21 to facilitate raising and lowering of the board 21.

When in its operative position, the rigid board 21 and flexible extension 30 will deflect the backdraught away from the occupants of the seats 11.

When the rigid board 21 is in its operative position, the position of the pivotal connection between the links 23 and the rigid board 21, will ensure that the pressure of the backdraught will maintain the rigid board 21 in its operative position. Alternatively, geometric locking means or a latch mechanism may be provided for this purpose. Furthermore, means may be provided to lock the rigid board 21 in its retracted position, so that when not in use, it will move with the lid 16 of locker 15.

While in the above embodiment the rigid board 21 is arranged to be moved manually, means may be provided to move it automatically to its operative position when the vehicle hood is lowered.

Figure 4:
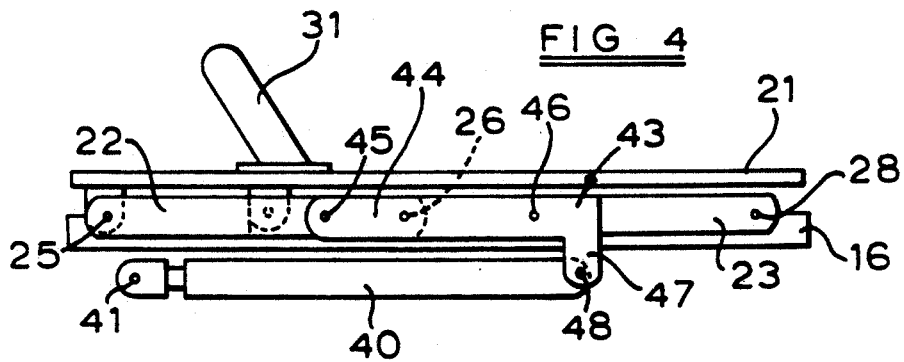
FIG. 4 illustrates, in sectional side elevation, a modification to the embodiment illustrated in FIGS. 2 and 3, with the wind deflector in its retracted position.
Figure 5:
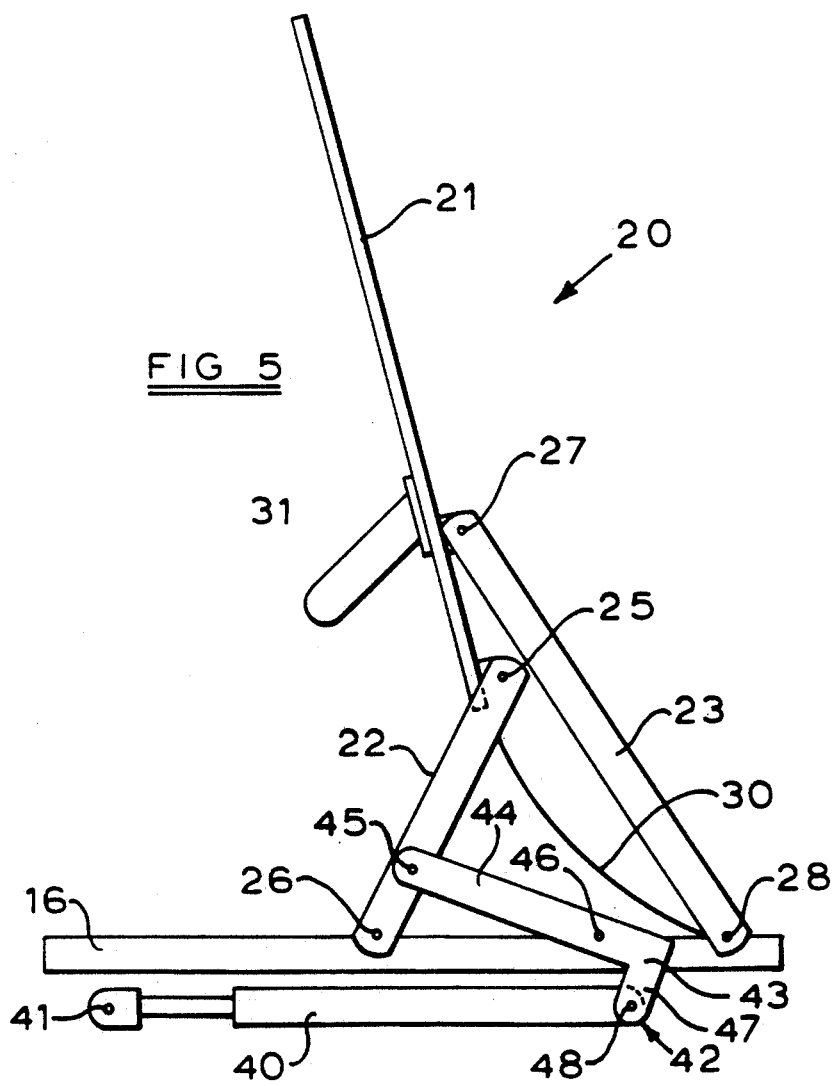
FIG. 5 illustrates the embodiment shown in FIG. 4, in its operative position.
Figure 6:
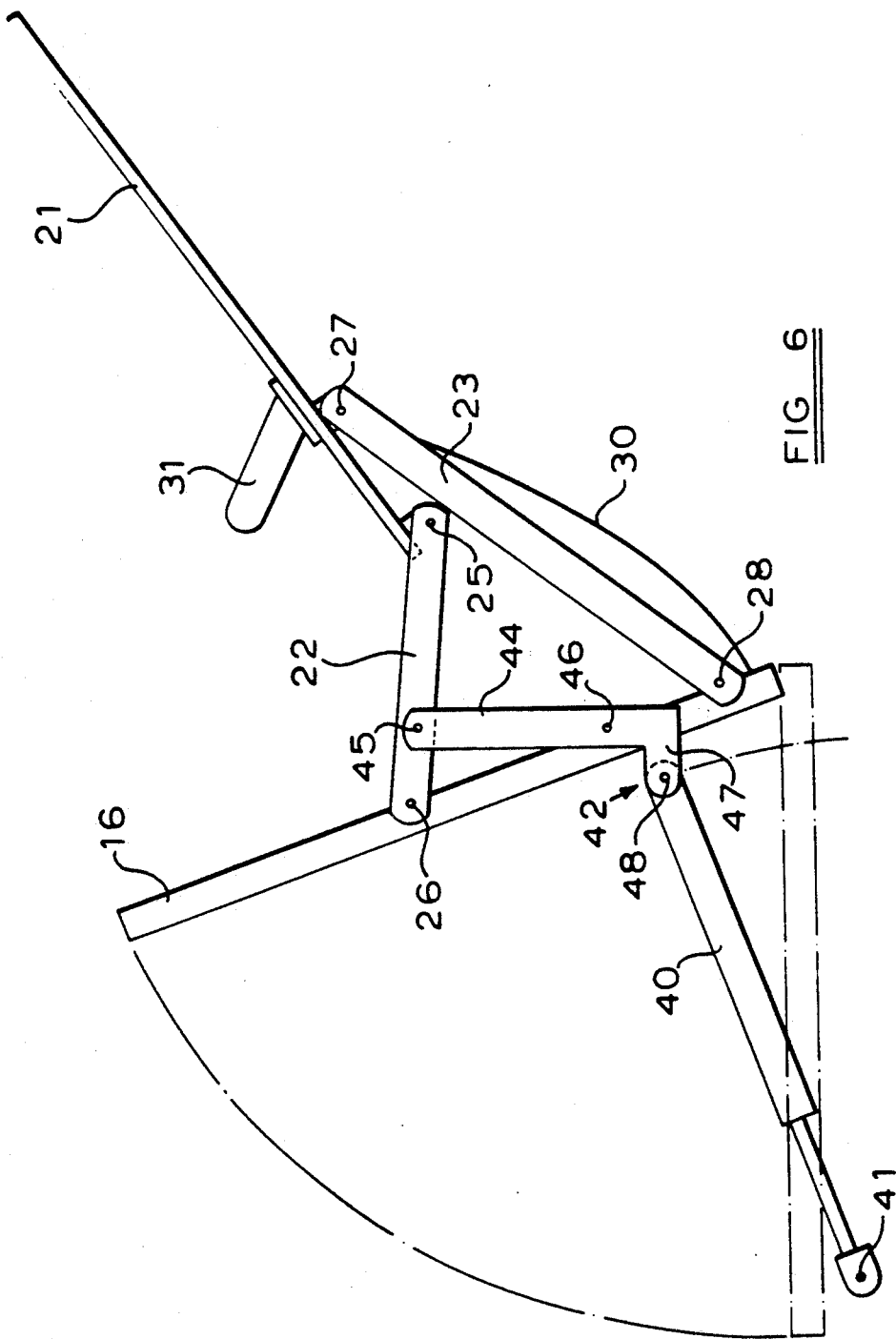
FIG. 6 illustrates the embodiment shown in FIG. 4 with the luggage locker lid open.

In the embodiment illustrated in FIGS. 4 to 6, a pair of gas struts 40 are mounted one adjacent to each of the side edges of the lid 16 of luggage locker 15. The gas struts 40 are located at a level beneath and substantially parallel to the lid 16, when closed. One end 41 of each gas strut 40, is pivotally mounted with respect to the vehicle, adjacent the leading edge of the lid 16. The other end 42 of each gas strut 40 is connected to the first link 22 on the adjacent side of the wind deflector 20, by a bell crank lever 43. A first limb 44 of the bell crank lever 43 is connected to the link 22 by pivot 45, intermediate of the ends of link 22. The bell crank lever 43 is mounted at a point intermediate of its ends, with respect to the lid 16, by means of a sliding pivot 46. The end 42 of gas strut 40 is connected to the end of a downwardly extending limb 47 of the bell crank lever 43 by pivot 48.

As illustrated in FIG. 4, when the lid 16 is closed and the wind deflector in its retracted position, the limb 44 of bell crank lever 43 lies parallel to the links 22 and 23, the pivot being located at a forward extremity of its sliding path. In this position, the gas strut 40 is substantially parallel to the lid 16 and air in the gas strut 40 is under compression, so that it applies a load to the end of the bell crank lever 43 to which it is connected. When the wind deflector 20 is moved from its retracted position to its operational position, the link 22 pivots rearwardly, causing the limb 44 of the bell crank lever 43 to pivot upwardly. Upward pivoting of the limb 44 is accommodated by rearward movement of the pivot 46 under the influence of the load applied by the gas strut 40. The gas strut 40 thereby provides assistance to movement of the wind deflector from its retracted to its operative position. Furthermore, the gas strut 40 will also extend further on opening of the lid 16, as illustrated in FIG. 6, thereby providing assistance also for the opening of the lid 16. The gas strut 40 will provide assistance to the opening of the lid 16 with the wind deflector 20 in either its retracted or its operative positions.

Figure 7:
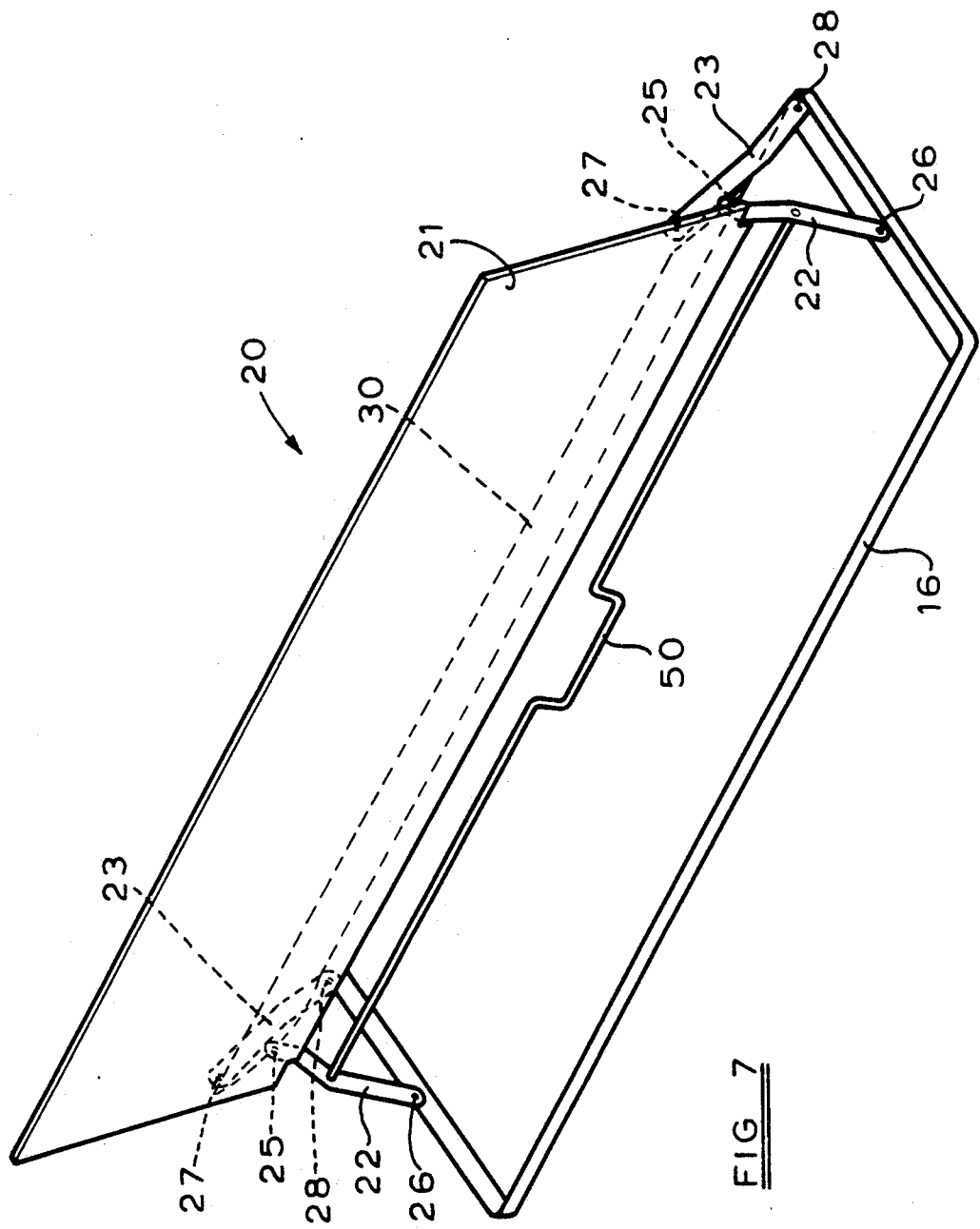
FIG. 7 illustrates a further modification to the wind deflector illustrated in FIG. 1.

As illustrated in FIG. 7, the linkage mechanisms 22,23 on each end of the rigid board 21 may be tied together by means of a torsion bar 50. This torsion bar 50 is mounted between links 22 at opposite ends of the board 21 at positions spaced equally from the pivotal connection of each respective link 22 to the board 21. The torsion bar 50 will ensure that the links 22 on each side of the board 21 move together, as the board 21 is raised or lowered. A torsion bar 50 similar to that described above may be used together with a gas strut or similar means as described with reference to FIGS. 4 to 6. Alternatively the torsion bar 50 ma interconnect links 23 on each end of the board 21.

Various modifications may be made without departing from the invention. For example, while in the above embodiment the flexible extension 30 is secured to the rear longitudinal edge of lid 16, a retractor mechanism, for example in the form of a roller blind mechanism, may be provided along this edge to take up slack in the flexible extension. Alternatively, the extension may be rigid and pivotally connected to the rigid board 21 at a position which will enable it to fold under the rigid board 21, when the rigid board 21 is moved from its operative to its retracted position. In a further embodiment, the rigid board 21 may form the lid of the luggage locker 15.

We claim:

1. A wind deflector for shielding the occupants of a convertible vehicle from backdraughts comprising a rigid board which is mounted on a substantially flat surface behind the seats of a vehicle, the board being mounted on the flat surface by means of a linkage mechanism by which it may be moved between a retracted position, in which it lies flat against the flat surface, to an operative position in which it extends upwardly behind the seats to a height sufficient to shield the occupants of the vehicle from backdrauqhts, the lower edge of the rigid board being spaced above the flat surface when the rigid board is in its operative position and an extension of the deflector being attached to the rigid board and the flat surface.

2. A wind deflector according to claim 1 in which the extension is made from a windproof flexible material.

3. A wind deflector according to claim 1 in which the rigid board is mounted to the flat surface by means of a pair of links adjacent each end of the rigid board, a first link being pivotally connected at one end adjacent a longitudinal edge of the rigid board the other end of said link being pivotally connected to the flat surface and a second link being pivotally connected at one end intermediate of the longitudinal edges of the rigid board and at the other end to the flat surface at a position spaced rearwardly of the first link.

4. A wind deflector according to claim 3 in which the second link at each end of the board, is pivotally connected to the rigid board intermediate of the longitudinal edges thereof, but spaced towards the edge attached to the first link.

5. A wind deflector according to claim 3 in which the extension is attached to the rigid board adjacent the axis of the pivotal connections of the second links to the rigid board.

6. A wind deflector according to claim 1 in which the flat surface is defined by the lid of a luggage locker.

7. A wind deflector according to claim 1 in which means is provided to give assistance to manual movement of the wind deflector between its retracted and operative positions.

8. A wind deflector according to claim 7 in which said assistance means comprises a gas strut acting upon the linkage mechanism.

9. A wind deflector according to claim 7 in which the wind deflector is mounted on the lid of a luggage locker, said means for giving assistance to movement of the wind deflector also giving assistance to opening of the lid.

10. A wind deflector according to claim 1 in which linkage mechanisms are provided at each end of the rigid board, the linkage mechanism at one end of the board being interconnected with that at the other end of the board by a torsion bar which acts to ensure that both linkage mechanisms move together.

* * * * *